(12) United States Patent
Creeth et al.

(10) Patent No.: US 8,753,783 B2
(45) Date of Patent: *Jun. 17, 2014

(54) FUEL CELLS WITH IMPROVED RESISTANCE TO FUEL CROSSOVER

(75) Inventors: Andrew Martin Creeth, Chester (GB); Jian-Guo Liu, Runcorn (GB)

(73) Assignee: ACAL Enegy Limited, Runcorn, Cheshire (GB)

( * ) Notice: Subject to any disclaimer, the term of this patent is extended or adjusted under 35 U.S.C. 154(b) by 990 days.

This patent is subject to a terminal disclaimer.

(21) Appl. No.: 12/298,355

(22) PCT Filed: Apr. 24, 2007

(86) PCT No.: PCT/GB2007/050211
§ 371 (c)(1),
(2), (4) Date: Jun. 26, 2009

(87) PCT Pub. No.: WO2007/122431
PCT Pub. Date: Nov. 1, 2007

(65) Prior Publication Data
US 2009/0325002 A1 Dec. 31, 2009

(30) Foreign Application Priority Data
Apr. 25, 2006 (GB) .................................. 0608079.0

(51) Int. Cl.
*H01M 8/18* (2006.01)
*H01M 8/20* (2006.01)

(52) U.S. Cl.
CPC ............... *H01M 8/188* (2013.01); *H01M 8/20* (2013.01)
USPC ........... 429/513; 429/502; 429/499; 429/451; 429/447; 429/417

(58) Field of Classification Search
USPC .......................................... 429/502, 503, 506
See application file for complete search history.

(56) References Cited

U.S. PATENT DOCUMENTS 3,152,013 A 10/1964 Juda 3,279,949 A 10/1966 Schaefer et al.
(Continued)

FOREIGN PATENT DOCUMENTS

EP 0 043 647 1/1982
EP 0 228 168 11/1986
(Continued)

OTHER PUBLICATIONS

S.R. Alley and W. Henderson, "Synthesis and characterization of ferrocenyl—phosphonic and —arsonic acids," J. Organomet. Chem., 637-639, 2001, 216-229.

(Continued)

*Primary Examiner* — Ula C Ruddock
*Assistant Examiner* — Scott J Chmielecki
(74) *Attorney, Agent, or Firm* — Knobbe Martens Olson & Bear LLP

(57) ABSTRACT

The invention provides a fuel cell comprising an anode in an anode region of the cell and a cathode in a cathode region of the cell, the anode being separated from the cathode by an ion selective polymer electrolyte membrane, the anode region of the cell being supplied in use thereof with an alcoholic fuel, the cathode region of the cell being supplied in use thereof with an oxidant, the cell being provided with means for generating an electrical circuit between the anode and the cathode and with a non-volatile redox couple in solution in flowing fluid communication with the cathode in the cathode region of the cell, the redox couple being at least partially reduced at the cathode in operation of the cell, and at least partially re-generated by reaction with the oxidant after such reduction at the cathode, the redox couple and/or the concentration of the redox couple in the catholyte solution being selected so that the current density generated by the cell in operation is substantially unaffected by the crossover of the alcoholic fuel from the anode region of the cell to the cathode region of the cell across the polymer electrolyte membrane.

17 Claims, 4 Drawing Sheets

(56) References Cited

U.S. PATENT DOCUMENTS

| | | | |
|---|---|---|---|
| 3,294,588 A | 12/1966 | Beltzer et al. | |
| 3,360,401 A | 12/1967 | Grasselli et al. | |
| 3,540,933 A | 11/1970 | Boeke | |
| 3,607,420 A | 9/1971 | Cutler | |
| 4,048,383 A * | 9/1977 | Clifford | 429/422 |
| 4,396,687 A * | 8/1983 | Kummer et al. | 429/417 |
| 5,250,158 A | 10/1993 | Kaneko et al. | |
| 5,298,343 A | 3/1994 | Savadogo et al. | |
| 5,660,940 A | 8/1997 | Larsson et al. | |
| 5,683,829 A | 11/1997 | Sarangapani | |
| 5,958,616 A | 9/1999 | Salinas et al. | |
| 6,054,580 A | 4/2000 | Collins et al. | |
| 6,270,649 B1 | 8/2001 | Zeikus et al. | |
| 2001/0028977 A1 | 10/2001 | Kazacos et al. | |
| 2003/0152823 A1 | 8/2003 | Heller | |
| 2004/0028203 A1 | 2/2004 | Wurster et al. | |
| 2004/0028992 A1 | 2/2004 | Jaouen | |
| 2004/0137297 A1 * | 7/2004 | Matsuoka et al. | 429/30 |
| 2005/0074653 A1 | 4/2005 | Broman | |
| 2005/0112055 A1 | 5/2005 | Shannon et al. | |
| 2005/0158618 A1 | 7/2005 | Liberatore et al. | |
| 2005/0244707 A1 | 11/2005 | Skyllas-Kazacos et al. | |
| 2006/0012637 A1 | 1/2006 | Furukawa et al. | |
| 2006/0024539 A1 * | 2/2006 | Dumesic et al. | 429/17 |
| 2006/0088750 A1 | 4/2006 | Nobuta | |
| 2006/0134493 A1 | 6/2006 | Yoshida et al. | |
| 2006/0216565 A1 | 9/2006 | Cooray et al. | |
| 2006/0251959 A1 * | 11/2006 | Karamanev | 429/101 |
| 2007/0078052 A1 | 4/2007 | Grinberg et al. | |
| 2007/0122689 A1 | 5/2007 | Kubo et al. | |
| 2007/0131546 A1 | 6/2007 | Nomoto et al. | |
| 2008/0274385 A1 | 11/2008 | Creeth | |
| 2009/0308752 A1 | 12/2009 | Evans et al. | |
| 2009/0317668 A1 | 12/2009 | Creeth et al. | |
| 2010/0112388 A1 | 5/2010 | Creeth et al. | |
| 2010/0112393 A1 | 5/2010 | Creeth et al. | |
| 2010/0297522 A1 | 11/2010 | Creeth et al. | |
| 2011/0014532 A1 | 1/2011 | Knuckey et al. | |
| 2011/0027671 A1 | 2/2011 | Knuckey et al. | |
| 2011/0039170 A1 | 2/2011 | Creeth et al. | |
| 2011/0091746 A1 | 4/2011 | Knuckey et al. | |

FOREIGN PATENT DOCUMENTS

| | | |
|---|---|---|
| EP | 0 517 217 | 12/1992 |
| EP | 0 595 688 | 10/1993 |
| EP | 0 592 988 | 4/1994 |
| EP | 0 790 658 | 8/1997 |
| EP | 0 878 850 | 5/1998 |
| EP | 1 143 546 | 10/2001 |
| GB | 1 176 632 | 1/1970 |
| GB | 1 176 633 | 1/1970 |
| GB | 2 400 974 | 10/2004 |
| GB | 0505087.7 | 3/2005 |
| GB | 2 424 118 | 3/2006 |
| GB | 0605878.8 | 3/2006 |
| GB | 0608079.0 | 4/2006 |
| GB | 0614337.4 | 7/2006 |
| GB | 0614338.2 | 7/2006 |
| GB | 0718349.4 | 9/2007 |
| GB | 0718577.0 | 9/2007 |
| GB | 2 440 434 | 1/2008 |
| GB | 2 440 435 | 1/2008 |
| GB | 0801195.9 | 1/2008 |
| GB | 0801198.3 | 1/2008 |
| GB | 0801199.1 | 1/2008 |
| GB | 0907795.9 | 5/2009 |
| GB | 0913638.3 | 8/2009 |
| GB | 2 440 489 | 10/2009 |
| JP | 56 042970 | 4/1981 |
| JP | 61 054163 | 3/1986 |
| JP | 62 015770 | 1/1987 |
| JP | 05-295578 | 11/1993 |
| JP | 11-288727 | 10/1999 |
| JP | 2004 319292 | 11/2004 |
| RU | 2004129396 | 3/2006 |
| WO | WO 91/13681 | 9/1991 |
| WO | WO 96/31912 | 10/1996 |
| WO | WO 00/12667 | 3/2000 |
| WO | WO 00/22688 | 4/2000 |
| WO | WO 00/29537 | 5/2000 |
| WO | WO 01/73881 | 10/2001 |
| WO | WO 03/083967 | 10/2003 |
| WO | WO 2005/112055 | 11/2005 |
| WO | WO 2006/012637 | 2/2006 |
| WO | WO 2006/057387 | 6/2006 |
| WO | WO 2006/097438 | 9/2006 |
| WO | WO 2006/121191 | 11/2006 |
| WO | WO 2007/101284 | 9/2007 |
| WO | WO 2007/110663 | 10/2007 |
| WO | WO 2007/122431 | 11/2007 |
| WO | WO 2008/009993 | 1/2008 |
| WO | WO 2008/009992 A2 | 1/2009 |
| WO | WO 2009/037513 | 3/2009 |
| WO | WO 2009/040577 | 4/2009 |
| WO | WO 2009/093080 | 7/2009 |
| WO | WO 2009/093081 | 7/2009 |
| WO | WO 2009/093082 | 7/2009 |
| WO | WO 2010/128333 | 11/2010 |
| WO | WO 2011/015875 | 2/2011 |

OTHER PUBLICATIONS

I. Bernal et al., "Iron(II) Complexes of Polydentate Aminopyridyl Ligands and an Exchangeable Sixth Ligand: Reactions with peroxides . . . " J. Chem. Soc., Dalton. Trans., 1995, 3667-3675.

J. Chang, et al., "Synthesis and Characterization of Bis(d-2-pyridylmethanamine)ruthenium(II)," Inorg. Chem. 2004, 43, 1735-1742.

R. Dillon, S. Sriinivasan, A.S. Arico, V. Antonucci, "International Activities in DMFC R&D: status of technologies and potential applications," J. Power Sources, 127 , 2004, 112-126.

W. R. Harris et al., "Chelating Tendencies of Pyridyl—Containing Polyamines and Oxygenation of the Cobaltous Complexes," Inorg. Chem., 1978, 17, 889-894.

A. Heinzel, V.M. Barragan, "A review of the state-of-the-art of the methanol crossover in direct methanol fuel cells," J. Power Sources, 84, 1999, 70-74.

M.P. Hogarth, T.R. Ralph, "Catalysis for Low Temperature Fuel Cells," Platinum Metal Reviews, 46, 2002, 146-164.

M. Klopstra, R. Hage, R.M. Kellogg and B.L. Feringa, "Non-heme iron catalysts for the benzylic oxidation: a parallel ligand screening approach." Tet. Lett. 44, 2003, 4581-4584.

G.R. Knox and P.L. Pauson, "Ferrocene Derivatives, Part VII. Some Sulphur derivatives," J. Chem. Soc., 1958, 682.

Limoges, B.R. et al. "Electrocatalyst materials for fuel cells based on the polyoxometalates $[PMo(12-n)VnO40]<(3+n)->(n=0-3)$", Electrochimica Acta, Elsevier Scient Publishers, Barking, GB, vol. 50, No. 5, Jan. 15, 2005 pp. 1169, 1170, 1176-1179.

M. Lubben et al., "Nonheme Iron Centers in Oxygen Activation: Characterization of an Iron(III) Hydroperoxide Intermediate," Angew. Chem. Int. Ed. Engl., 34, 1995, 1512-1514.

D.L. Reger et al. , "Synthesis and structural characterization of the bitopic ferrocene-based tris(pyrazolyl)methane ligand Fe[C5H4CH2OCH2C(pz)3]2 (pz=pyrazolyl ring)" J. Chem. Crystallography, 35, 2005, 217-2253

H. Sato et al., "Convenient Synthesis of N,N,N',N'Tetrakis(2-pyridylmethyl)-α,ω-alkanediamines Using a Phase-Transfer Catalyst," Synthesis, 1992, 539-540.

M. Tamura et al., "Superoxide Dismutase Activity of Iron(II) TPEN complex and Its Derivatives," Chem. Pharm. Bull., 48, 2000, 1514-1518.

M. Van den Heuval et al., "Synthesis of a Non-Heme Template for Attaching Four Peptides: An Approach to Artificial Iron(II)—Containing Peroxidases," J. Organ. Chem., 69, 2004. 250-262.

V. Neburchilov, J. Martin, H. Wang, J. Zhang, "A Review of Polymer Electrolyte Membranes for Direct Methanol Fuel Cells," Journal of Power Sources, 2007, vol. 169, pp. 221-238.

J.G. Roelfes, "Models for Non-Heme Iron Containing Oxidation Enzymes," Jun. 4, 1972, pp. 1-154.

* cited by examiner

FUEL CELLS WITH IMPROVED RESISTANCE TO FUEL CROSSOVER

CROSS-REFERENCE TO RELATED APPLICATIONS

This Application is the US National Phase under 35 U.S.C. §371 of International Application No. PCT/GB2007/050211, filed Apr. 24, 2007, which was published in English as International Publication No. WO 2007/122431 on Nov. 1, 2007, and claims the benefit of GB 0608079.0, filed Apr. 25, 2006.

BACKGROUND

1. Field

The present invention relates to fuel cells, in particular to fuel cells in operation of which an alcohol is supplied as fuel to the anode region of the cell. Such cells have applications in microfuel cells for electronic and portable electronic components, and also in larger fuel cells for the automotive industry.

2. Description of the Related Art

A fuel cell is an electrochemical energy conversion device that converts fuel and oxidant into reaction products, producing electricity and heat in the process. In one example of such a cell, methanol is used as fuel, and air or oxygen as oxidant, and the products of the reaction are carbon dioxide and water. The electrochemical reactions in this cell in operation may be summarised as follows:

Anode $CH_3OH + H_2O \leftrightharpoons CO_2 + 6H^+ + 6e^-$

Cathode $\tfrac{3}{2}O_2 + 6H^+ + 6e^- \leftrightharpoons 3H_2O$

Overall $CH_3OH + \tfrac{3}{2}O_2 \leftrightharpoons CO_2 + 2H_2O$

The methanol fuel and oxidant are fed respectively into catalysing, diffusion-type electrodes separated by an electrolytic membrane which allows the passage of protons from the anode chamber to the cathode chamber to balance the cathode reaction. The electrons generated in the anode chamber flow in an external electrical circuit and are returned to the cathode having provided the power output from the cell. Such fuel cells are known as direct methanol fuel cells (DMFCs). Various types of membrane may be used, such as polymer electrolyte membranes (PEMs), comprising for example Nafion™. Fuel cells based on polymer electrolyte membranes (PEM fuel cells) are convenient for portable applications such as portable electronics and automotive technology due to their relatively low temperatures of operation. Further or alternative adaptations to the PEM barrier include the provision of a bimembrane as described in our co-pending application PCT/EP2006/060640.

WO-A-2006/012637 discloses a reactor and corresponding method for producing electrical energy using a fuel cell by selectively oxidising CO at room temperature using polyoxometallate compounds.

US-A-2005/0112055 discloses a catalyst comprising diruthenium-substituted polyoxometallate and a method of using the electrocatalyst to generate oxygen.

US-A-2004/0137297 discloses an ion exchange membrane said to be useful for the diaphragm of a direct methanol type fuel cell.

Methanol and other low molecular weight alcohols are convenient fuels for portable fuel cells because their energy density is relatively high, eg, for methanol, six moles of electrons being generated in the electrochemical half cell for every mole of fuel consumed. However, DMFCs typically suffer from crossover effects—methanol is transported across the membrane by diffusion and electro-osmosis. This causes a reduction in the performance of the fuel cell by the effect of methanol being oxidized at the cathode, typically comprising Pt or other noble metal catalyst. Here the methanol is oxidized at the potentials of oxygen reduction. The potential and current are reduced, causing a loss in power density; the open circuit potential is also reduced.

Conventionally, routes to reduce the methanol crossover effect have included:

i) Increasing the membrane thickness—typically 170 μm Nafion is used instead of the more common 50 μm membrane for hydrogen fuel cells. This increases the resistance of the membrane—whilst not completely eliminating the crossover impact.

ii) Using an alternative membrane to the Nafion-type sulphonated fluoropolymer. Usually these membranes require higher temperatures (>100° C.) to operate effectively, or conduct less well or swell.

iii) Using selective catalysts for the cathode. These are generally poorer catalysts for oxygen reduction than noble metal-containing catalysts such as Pt and Pt-containing catalysts.

The phenomenon of methanol crossover and potential solutions have been reviewed recently:

International activities in DMFC R&D: status of technologies and potential applications, R Dillon, S Sriinivasan, A S Arico, V Antonucci, J Power Sources, 127, 112 (2004).

M P Hogarth, T R Ralph, Platinum Metal Reviews, 46, 146 (2002).

A Heinzel, V M Barragan, J Power Sources, 84, 70 (1999).

SUMMARY

It is an object of the present invention to provide an improved alcohol-fuelled fuel cell. In particular, it is intended overcome or ameliorate one or more of the aforesaid disadvantages caused by crossover of the alcoholic fuel across the membrane separating the anode from the cathode. It is a more specific object of the invention to reduce the impact of crossover of direct methanol or other alcohol fuel cells whilst being able to operate at a temperature below that requiring applied pressure, and without unsatisfactorily compromising cell performance.

According to the present invention there is provided a fuel cell comprising an anode in an anode region of the cell and a cathode in a cathode region of the cell, the anode being separated from the cathode by an ion selective polymer electrolyte membrane, the anode region of the cell being supplied in use thereof with an alcoholic fuel, the cathode region of the cell being supplied in use thereof with an oxidant, the cell being provided with means for generating an electrical circuit between the anode and the cathode and with a non-volatile redox couple in solution in flowing fluid communication with the cathode in the cathode region of the cell, the redox couple being at least partially reduced at the cathode in operation of the cell, and at least partially re-generated by reaction with the oxidant after such reduction at the cathode, the redox couple and/or the concentration of the redox couple in the catholyte solution being selected so that the current density for a given potential generated by the cell in operation is substantially unaffected by the oxidation of alcoholic fuel due to crossover from the anode region of the cell to the cathode region of the cell across the polymer electrolyte membrane.

By "substantially unaffected" is preferably meant that the current density, for any given potential, of alcoholic fuel oxidation at the cathode when the cell in operation at a particular temperature is less than about 10%, more preferably less than about 5%, most preferably by less than about 1% over a period of time during which crossover of fuel across the polymer electrolyte membrane occurs.

A fuel cell in accordance with the invention may conveniently be tested for compliance with these and the following criteria by test doping the cathode region of the cell with the alcoholic fuel, for example at a concentration of alcoholic fuel in the doped catholyte solution comparable to that found due to crossover of fuel from the anode.

A fuel cell is provided in accordance with the invention in which the current density for any given potential due to oxidation of the alcoholic fuel is less than about 10%, more preferably less than about 5% and most preferably less than about 1% when the cathode chamber is supplied with alcoholic fuel at a concentration comparable to that created by crossover.

In one embodiment, the fuel cell is fitted with a switchable electronic valve that allows reverse flow of electrons along a connecting line in the circuit when electromotive force is supplied to the fuel cell.

The invention therefore provides a cathode regenerative redox flow system comprising a liquid flowing catholyte solution and a chamber for the regeneration of a redox species consumed at the electrode by oxygen, Surprisingly this has been found to reduce the impact of alcohol fuel, eg methanol, crossover. Without wishing to be limited by theory, it appears that methanol is effectively inactive at the cathode, enabling the catholyte redox species to be unimpeded in its reduction at the cathode.

In operation the fuel cell will usually provide electromotive force to some external mechanism (the drive shaft of an automobile or the processor of an electronic component, for example).

Suitable fuels include low molecular weight alcohols such as methanol, ethanol, propanol, isopropanol and butanol, dipropylene glycol and ethylene glycol.

Suitable oxidant gas materials include oxygen and air and hydrogen peroxide.

Preferably the anode electrode comprises a diffusion layer and an electrocatalyst layer. The diffusion layer is suitably of a graphitic nature, and the electrocatalyst layer is suitably of finely divided platinum or palladium. Platinum based alloys are also suitable for use in one or both electrodes, the alloy metal being suitably selected from tin, iridium, osmium, rhenium or ruthenium. Generally speaking, the choice of alloy depends on the fuel to be oxidised at the anode electrode. Platinum-ruthenium alloy anodes are preferable for electro-oxidation of methanol, for example.

The cathode in the redox fuel cell of the invention may comprise as cathodic material carbon, platinum, nickel, metal oxide species. However, it is preferable that expensive cathodic materials are avoided, and therefore preferred cathodic materials include carbon, nickel, metal oxide. The cathodic material may be constructed from a fine dispersion of particulate cathodic material, the particulate dispersion being held together by a suitable adhesive, or simply by the proton conducting polymeric material. The cathode is designed to create maximum flow of redox mediator to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

Transition metal ions, and complexes of transition metal ions form suitable redox couples for use in the fuel cell of the invention. Suitable transition metals include vanadium, molybdenum, iron, manganese and copper. One example of a suitable redox couple is the ferrous/ferric phenanthroline complex. Other examples include polyoxometallates. In one fuel cell of the invention, the redox couple comprises a polyoxometallate species. In this case the catholyte solution preferably comprises at least about 0.1M of a polyoxometallate.

The polyoxometallate when used as the redox species may be represented by the formula:

$$X_a[Z_bM_cO_d]$$

wherein:

X is selected from hydrogen, alkali metals, alkaline earth metals, ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M is a metal selected from Mo, W, V, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series, and combinations of two or more thereof;

a is a number of X necessary to charge balance the $[M_cO_d]$ anion;

b is from 0 to 20, more preferably 0-2;

c is from 1 to 40; and d is from 1 to 180.

Vanadium and molybdenum, and combinations thereof, are particularly preferred for M.

Phosphorus is particularly preferred for Z.

A combination of hydrogen and an alkali metal and/or alkaline earth metal is particularly preferred for X. One such preferred combination is hydrogen and sodium.

Specific examples of polyoxometallates include molybdophosphoric acid, $H_3PMo_{12}O_{40}$ and molybdovanadophosphoric acid, $H_5PMo_{10}V_2O_{40}$.

Thus, according to a first aspect of the present invention, there is provided a fuel cell in accordance with the invention wherein the catholyte solution comprises a polyoxometallate catalyst. In a preferred embodiment of the present invention, the catalyst comprises vanadium. In a more preferred embodiment, the catalyst comprises vanadium and molybdenum. In a preferred embodiment of the present invention, the polyoxometallate comprises vanadium, more preferably vanadium and molybdenum. Thus, the catalyst may be $H_3Na_2PMo_{10}V_2O_{40}$. Alternatively, the catalyst may be $H_3Na_3PMo_9V_3O_{40}$ or $H_3Na_4PMo_8V_4O_{40}$ and compounds of intermediate composition. In addition, a mixture of these or other polyoxometallate catalysts is also envisaged. For this embodiment, preferably, at least one X is hydrogen. However, it is also preferred that not all X be hydrogen. More preferably, at least two of X are not hydrogen. X comprising at least one hydrogen and at least one other material selected from alkali metals, alkaline earth metals, ammonium and combinations of two or more thereof is preferred.

The concentration of the polyoxometallate in the catholyte solution is preferably at least about 0.1M, preferably at least about 0.15M, more preferably at least about 0.175M and most preferably at least about 0.2M.

Accordingly, the present invention provides a redox fuel cell comprising an anode and a cathode separated by an ion selective polymer electrolyte membrane; means for supplying an alcoholic fuel to the anode region of the cell; means for supplying an oxidant to the cathode region of the cell; means for providing an electrical circuit between the anode and the cathode; a solution containing non-volatile catholyte components flowing in fluid communication with the cathode, the catholyte solution comprising a redox couple being at least partially reduced at the cathode in operation of the cell, and at least partially re-generated by reaction with the oxidant after such reduction at the cathode, the catholyte solution comprising at least about 0.1M of the said redox couple.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulfonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin-type ion exchange resins include polyvinylalcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytriflurostyrene sulphonic, sulphonated trifluorostyrene, sulphonated copolymers based on $\alpha,\beta,\beta$-trifluorostyrene monomer, radiation-grafted membranes. Non-fluorinated membranes include sulphonated poly(phenylquinoxalines), poly (2,6 diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl sulphonic acid siloxane (PBSS).

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bi-membrane may comprise at least two discreet membranes which may be placed side-by-side with an optional gap therebetween. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution In the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials from passing therethrough from the cathode side to the anode side thereof, although in this case anionic materials may pass from the cathode side of the anionic-selective membrane to the anode side thereof, whereupon they may combine with protons passing through the membrane in the opposite direction. Preferably the anion selective membrane is selective for hydroxyl ions, and combination with protons therefore yields water as product.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprises one or more perforations in the cation selective membrane, allowing such flushing directly through the membrane. Alternatively means may be provided for channelling flushed materials around the cation selective membrane from the interstitial space to the cathode side of the said membrane.

According to another aspect of the present invention, there is provided a method of operating a proton exchange membrane fuel cell comprising the steps of:
a) forming $H^+$ ions by the oxidation of an alcoholic fuel at an anode situated adjacent to a proton exchange membrane;
b) supplying a catholyte comprising a non-volatile redox couple solution in an oxidised state to a cathode situated oppositely adjacent to the proton exchange membrane; and
c) allowing the redox couple to become reduced upon contact with the cathode concomitantly with $H^+$ ions passing through the membrane to balance charge.

In a preferred embodiment, the catholyte is supplied from a catholyte reservoir.

The method of the above fourth aspect may additionally comprise the step of:
d) passing the catholyte from the cathode to a reoxidation zone wherein the catalyst is reoxidised.

In this embodiment, the cell is cyclic and the redox couple in the cathode can be repeatedly oxidised and reduced without having to be replaced.

BRIEF DESCRIPTION OF THE DRAWINGS

The invention will now be more particularly described with reference to the following Figures and Examples, in which.

DETAILED DESCRIPTION

Figure 7:
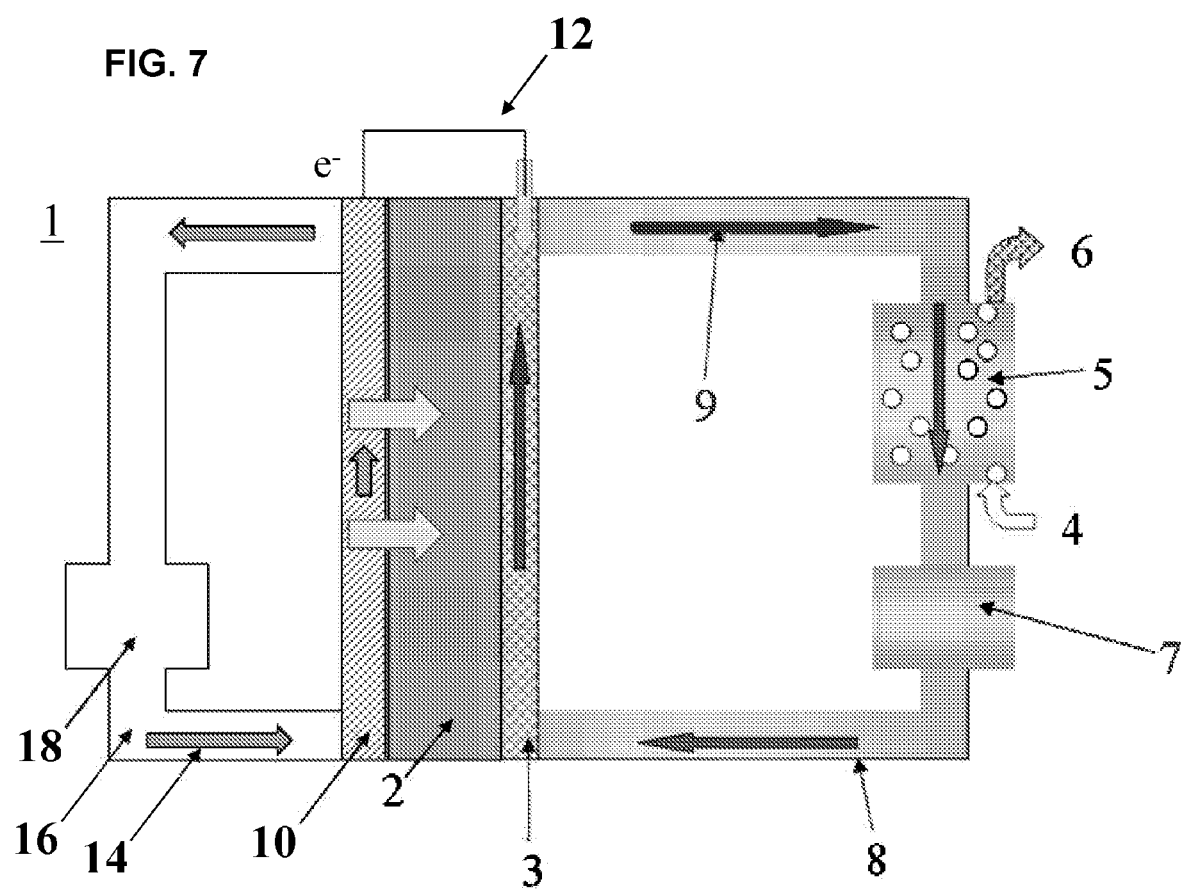
FIG. 7 shows a schematic diagram of a fuel cell constructed and arranged in accordance with the invention.

Referring to FIG. 7, there is shown the cathode and anode side of fuel cell 1 in accordance with the invention comprising a polymer electrolyte membrane 2 separating an anode 10 from cathode 3. Cathode 3 comprises in this diagram reticulated carbon and is therefore porous. However other porous materials such as carbon felts and similar carbon fibre-based systems, as well as porous metal foams and grids and metal particles and metal oxide particles deposited on these porous materials. Polymer electrolyte membrane 2 comprises cation selective Nafion 115 membrane through which protons generated by the (optionally catalytic) oxidation of fuel (in this case methanol) in the anode chamber pass in operation of the cell, as schematically shown by the large arrows in FIG. 7. Electrons (e⁻) generated at the anode 10 by the oxidation of fuel gas flow in an electrical circuit 12 and are returned to cathode 3. Fuel 14 (in this case methanol) is supplied to the fuel passage 16 from a fuel supply 18 of the anode chamber, while the oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (e.g., water and heat) can be discharged. The anode chamber is also provided with an exhaust for the carbon dioxide half reaction product in the anode region.

A catholyte solution comprising a catalyst and redox couple, in this case the oxidised form of the polyoxometallate provides both functions, is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then returned to cathode gas reaction chamber 5 via cathode outlet channel 9.

Due to the advantageous composition of the catholyte of the present invention, reoxidation of the catalyst occurs very rapidly, which allows the fuel cell to produce a higher sustainable current than with catholytes of the prior art.

Fuel, for example methanol, is passed against the first electrode (anode) and, at the first electrode the following redox reaction occurs:

$$CH_3OH + H_2O \leftrightharpoons CO_2 + 6H^+ + 6e^-$$

Electrons generated at the first electrode flow through the circuit, whilst protons generated at the first electrode flow through the gas diffusion substrate and through the polymer electrolyte membrane towards the second electrode.

The fuel cell is provided with a reservoir 8 of a redox couple, which may be generally indicated as [R]. [R] may comprise for example a ferrous/ferric phenanthroline complex or a polyoxometallate complex has hereinbefore described, or may be any other suitable redox couple. In operation of the cell the oxidised redox material is passed against the second electrode and $[R]^{ox}$ ions are reduced to $[R]^{red}$ ions.

$$[R]^{ox} + ne^- \rightarrow [R]^{red}$$

Water is also liberated in the gas reaction chamber in accordance with the following equation:

$$(4/n)[R]^{red} + O_2 + 4H^+ \rightarrow (4/n)[R]^{ox} + 2H_2O$$

If peroxide is used as the oxidant instead of air or oxygen, then the reaction becomes:

$$(2/n)[R]^{red} + H_2O_2 + 2H^+ \rightarrow (2/n)[R]^{ox} + 2H_2O$$

The reservoir is supplied in normal use of the cell with an oxidant material (for example air).

Preferably, the redox potential of the redox couple is less than about 0.6V, more preferably less than about 0.5V different from the potential of oxygen. For example the redox potential of the redox couple may be from about 0.01V to about 0.6V, from about 0.01V to about 0.5V, or from about 0.01V to about 0.3V different from the potential of oxygen.

Example 1

A catholyte solution comprising $H_3Na_2PMo_9V_3O_{40}$ was prepared and charged to the cathode chamber of a fuel cell generally in accordance with that described with reference to FIG. 7.

The membrane electrode assembly (MEA) in this experiment comprised: anode: JM PtRu black catalyst, 4.3 mg cm⁻² and 10% Nafion; cathode: 2.0 mm thick RVC+carbon veil. The anode gas diffusion layer was 10% teflonized carbon paper with 2 mg cm⁻² XC-72 C and 10% Nafion; Membrane: Nafion 115; Area: 6.25 cm². Flow field: modified commercial parallel anode and sink flow field in the cathode.

Figure 1A:
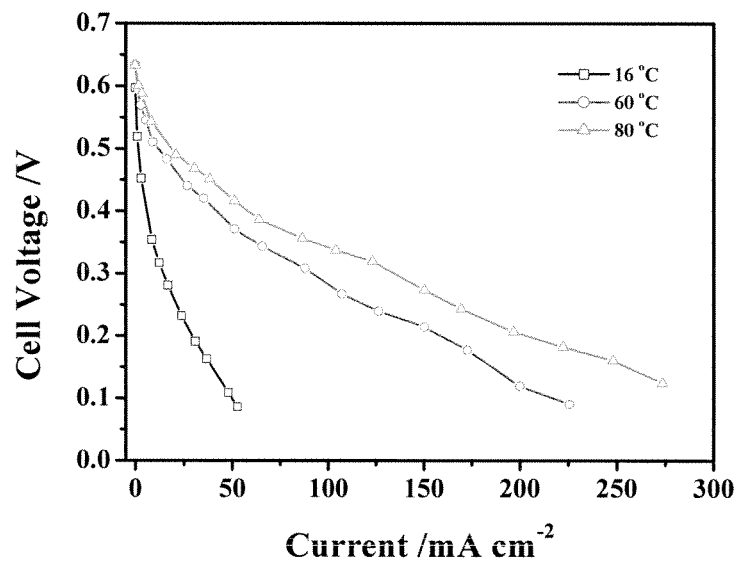
FIG. 1a shows the I-V curves of a fuel cell in accordance with the invention and described in Example 1 using POM (7 ml/min ~0.9 M vanadium (V) in ~0.3 M POM) in the cathode, 2 ml/min 1.0 M methanol in the anode.
Figure 1B:
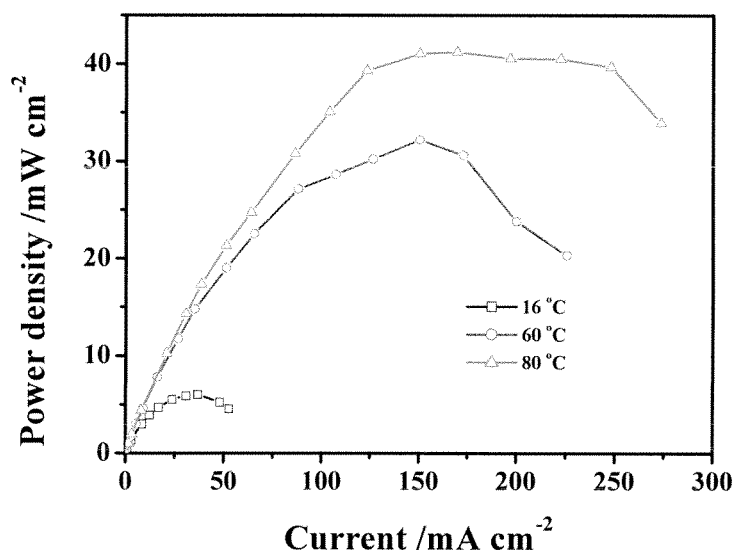
FIG. 1b shows the power densities of a fuel cell in accordance with the invention and described in Example 1 using POM (7 ml/min ~0.9 M vanadium (V) in ~0.3 M POM) in the cathode, 2 ml/min 1.0 M methanol in the anode.

As shown in FIG. 1, the performance of a redox cathode in a DMFC using a $H_3Na_3PMo_9V_3O_{40}$ POM system provides a maximum of power density at 80° C. of about 40 mW cm⁻², which decreases with the temperature.

Example 2

Figure 2:
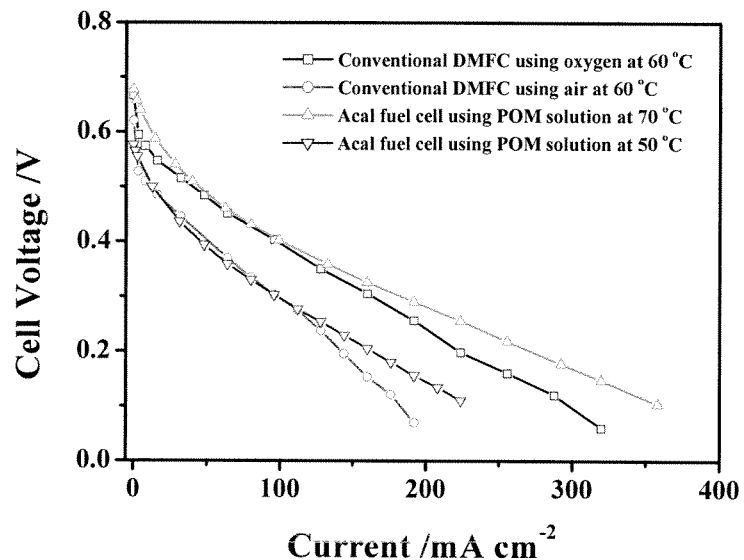
FIG. 2 shows a comparison of conventional DMFC with a POM/DMFC system (70 ml/min ~0.3 M POM solution, 2 ml/min 1.0 M methanol, membrane: Nafion 115, anode: PtRu, cathode: RVC) in accordance with the invention and described in Example 2.

The comparison, with reference to FIG. 2, is shown of the redox cathode compared with a gas cathode. It can be seen that the redox cathode performs better, the performance of an air gas cathode at 60° C. is comparable to the redox cathode performance at 50° C. The anode catalyst layer comprises 4 mg cm⁻² PtRu black from JM and 10 wt % Nafion inside. The anode gas diffusion layer was 10% teflonized carbon paper with 2 mg cm-2 XC-72 carbon and 10% Nafion.

Example 3

Figure 3:
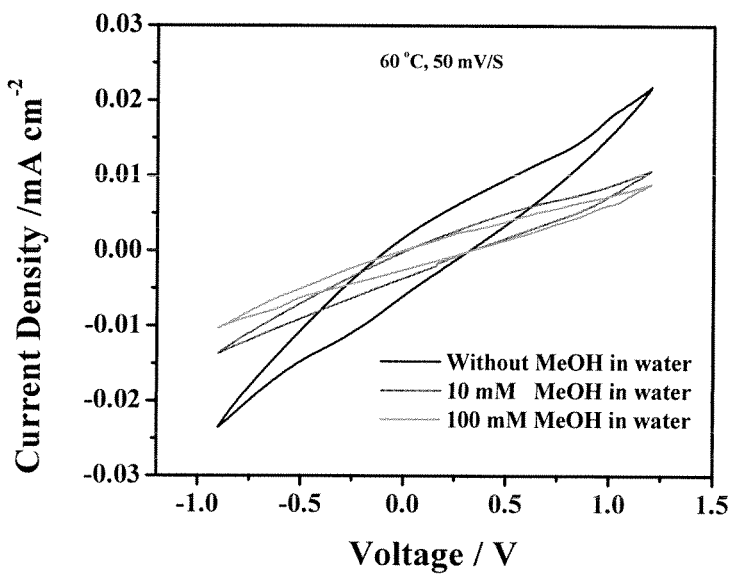
FIG. 3 shows a blank CV experiment without POM system at 60° C., 50 mV/S with the working electrode: 0.5 $cm^2$ RVC, CE: Platinum, RE: Ag/AgCl, described in Example 3.
Figure 4:
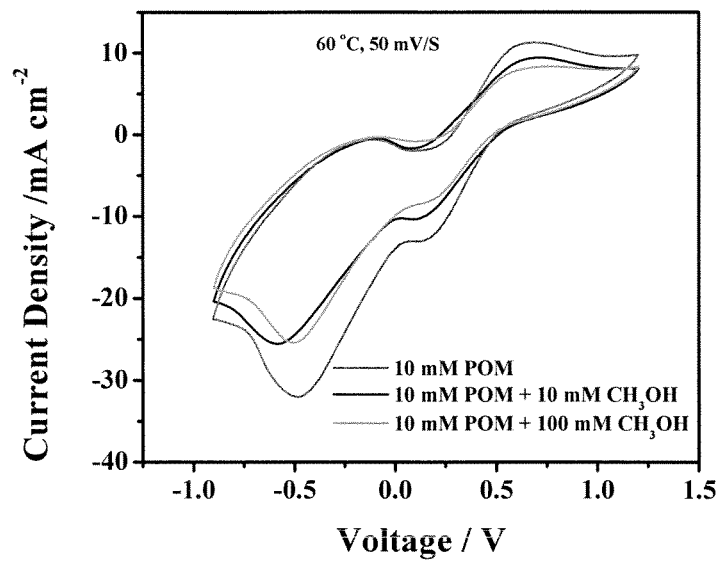
FIG. 4 shows the Example 3 CV curves with different POM solution at 60° C. with a scan rate of 50 mV/S with the working electrode: 0.5 cm² RVC, CE: Platinum, RE: Ag/AgCl.

Here, with reference to FIGS. 3 and 4, cyclic voltammetry is used to study the behaviour of methanol at the carbon electrode. A working electrode composed of 100 ppm RVC, used in the fuel cell studies was used. Current levels due to methanol were less than +/−0.01 mA cm⁻² in the range of potentials of operation of the fuel cell, which is a negligible current in comparison with the current densities of the fuel cell in operation. The CV of a low level of POM in the presence of methanol shows minimal impact in the range of operation of the fuel cell. Thus the impact of cross-over is limited at the electrode—no counter-current due to methanol oxidation occurs and there is little loss of the POM reduction.

Example 4

Figure 5:
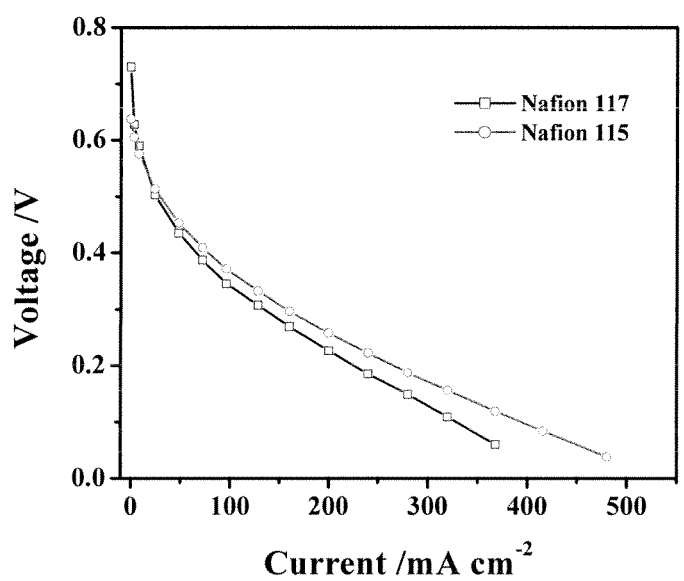
FIG. 5 shows the effect of Nafion membranes on the performance of POM/DMFC, 5 ml/min 1.0 M methanol, 180 ml/min 0.3M V3 POM, 500 ml in total MEA, RVC in the cathode, cell temperature: 77° C., referred to in Example 4

In this example similar cell, cathode and anode construction were used as for previous examples. FIG. 5 shows a comparison in performance between nafion 117 at ~180μ and nafion 115 at ~120μ. It is clearly shown that the performance is better over nearly the whole current/voltage range, in contrast to the air cathode where nafion 117 is preferred due to the detrimental effects on performance of methanol crossover.

Example 5

Figure 6:
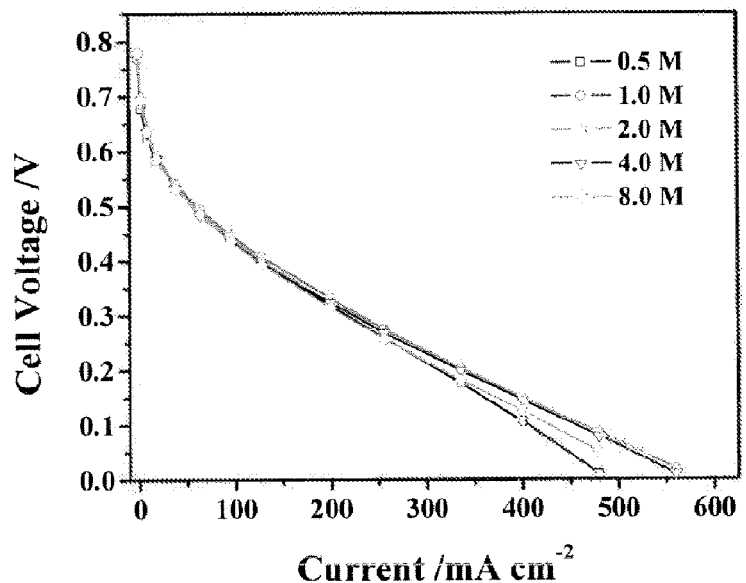
FIG. 6 shows the effect of methanol concentration on the performance of POM/DMFC, Nafion 117, E-Tek ½ MEA, RVC in the cathode, 2 ml/min methanol, 90 ml/min ~0.3 M V3 POM (total around 260 ml), cell temperature: 79-81° C., referred to in Example 5.

In this example, with reference to FIG. 6, was used a ½ MEA from Etek SERIES 12D-W MEA (5-layer) Half Membrane. Electrode Assembly for DMFC general purpose 5-layer, GDL base on woven web, in a similar cell and cathode to earlier examples using a modified commercial serpentine flow field for the anode. Other details are shown with the figure headings.

The benefit of using the fuel cell cathode of the invention is clear: there is no decrease in ocp with increasing methanol and little change in performance up to 8M MeOH, which contrasts strongly with air cathodes, where 1 M MeOH is preferred, and performance is weaker above 2 M methanol (Heinzel).

The invention claimed is:

1. A fuel cell comprising:
an anode in an anode region of the cell and a cathode in a cathode region of the cell, the anode being separated from the cathode by an ion selective polymer electrolyte membrane, the anode region of the cell being supplied in use thereof with an alcoholic fuel and the cathode region of the cell being supplied in use thereof with an oxidant;
an electrical circuit between the anode and the cathode; and
a non-volatile catholyte solution in flowing fluid communication with the cathode in the cathode region of the cell, the catholyte solution comprising a redox couple, wherein the redox couple is at least partially reduced at the cathode in operation of the cell, and at least partially re-generated by reaction with the oxidant after such reduction at the cathode, and wherein the redox couple comprises a polyoxometallate species;
wherein at least one of the redox couple and the concentration of the redox couple in the catholyte solution is selected so that the current density generated by the cell in operation is substantially unaffected by the oxidation of alcoholic fuel due to crossover of the alcoholic fuel from the anode region of the cell to the cathode region of the cell across the polymer electrolyte membrane.

2. A fuel cell according to claim 1, further comprising the alcoholic fuel supplied to the anode region, wherein the alcoholic fuel comprises at least one low molecular weight alcohol.

3. A fuel cell according to claim 2 wherein the alcoholic fuel is selected from the group consisting of methanol, ethanol, propanol, isopropanol, butanol, dipropylene glycol, ethylene glycol, and mixtures of two or more thereof.

4. A fuel cell according to claim 1 wherein the redox potential of the redox couple is about 0.01V to 0.3V different from the potential of oxygen.

5. A fuel cell according to claim 1 wherein the fuel cell is configured to operate at an operating temperature below about 100° C.

6. A fuel cell according to claim 1 wherein the redox couple comprises at least one transition metal complex.

7. A fuel cell according to claim 1 wherein the concentration of the redox couple in the catholyte solution is at least about 0.1 M.

8. A fuel cell according to claim 1 wherein the cathode region of the cell is provided with a reservoir for storing the catholyte solution.

9. A fuel cell according to claim 1 wherein the polyoxometallate is represented by the formula:

$$X_a[Z_bM_cO_d]$$

wherein:
X is selected from the group consisting of: hydrogen, alkali metals, alkaline earth metals, and ammonium, and combinations of two or more thereof;
Z is selected from the group consisting of: B, P, S, As, Si, Ge, Ni, Rh, Sn, Al, Cu, I, Br, F, Fe, Co, Cr, Zn, H2, Te, Mn and Se, and combinations of two or more thereof;
M is a metal selected from the group consisting of: Mo, W, V, Nb, Ta, Mn, Fe, Co, Cr, Ni, Zn, Rh, Ru, Tl, Al, Ga, In, metals selected from the 1st, 2nd and 3rd transition metal series, and the lanthanide series, and combinations of two or more thereof;
a is a number of X necessary to charge balance the $[M_cO_d]$ anion;
b is from 0 to 20;
c is from 1 to 40; and
d is from 1 to 180.

10. A fuel cell according to claim 9 wherein b is from 0 to 2.

11. A fuel cell according to claim 9 wherein M is selected from the group consisting of: vanadium, molybdenum, and combinations thereof.

12. A fuel cell according to claim 9 wherein Z is phosphorus.

13. A fuel cell according to claim 9 wherein X comprises a combination of hydrogen with alkali metal ions and/or alkaline earth metal ions.

14. A fuel cell according to claim 13, wherein X comprises hydrogen and sodium.

15. A fuel cell according to claim 1 wherein the polyoxometallate comprises one of molybdophosphoric acid ($H_3PMo_{12}O_{40}$) and molybdovanadophosphoric acid ($H_5PMo_{10}V_2O_{40}$).

16. A fuel cell according to claim 1 wherein the fuel cell is configured to generate a current density, which varies by less than 10% upon oxidation of the alcoholic fuel due to crossover.

17. A method of generating electricity by the fuel cell of claim 1, comprising:
supplying the alcoholic fuel to the anode region;
supplying the oxidant to the cathode region; and
generating electricity through the electrical circuit between the anode and the cathode.

* * * * *